United States Patent
Goto

(10) Patent No.: US 8,740,315 B2
(45) Date of Patent: Jun. 3, 2014

(54) AUTOMOBILE WHEEL

(75) Inventor: Yoshifumi Goto, Aichi (JP)

(73) Assignee: Central Motor Wheel Co., Ltd., Aichi (JP)

( * ) Notice: Subject to any disclaimer, the term of this patent is extended or adjusted under 35 U.S.C. 154(b) by 351 days.

(21) Appl. No.: 13/059,719

(22) PCT Filed: Dec. 15, 2009

(86) PCT No.: PCT/JP2009/070876
§ 371 (c)(1),
(2), (4) Date: Feb. 18, 2011

(87) PCT Pub. No.: WO2011/074065
PCT Pub. Date: Jun. 23, 2011

(65) Prior Publication Data
US 2011/0210602 A1     Sep. 1, 2011

(51) Int. Cl.
*B60B 3/10*     (2006.01)
(52) U.S. Cl.
USPC ................................... 301/64.101
(58) Field of Classification Search
USPC ............. 301/63.101, 63.103, 63.104, 63.106, 301/64.101, 63.102, 63.107
See application file for complete search history.

(56) References Cited

U.S. PATENT DOCUMENTS

| | | | |
|---|---|---|---|
| 7,018,000 B2* | 3/2006 | Alff et al. | 301/63.107 |
| 7,104,611 B2* | 9/2006 | Alff et al. | 301/63.107 |
| 7,464,973 B1* | 12/2008 | Chapman et al. | 166/77.51 |
| 7,464,995 B2* | 12/2008 | Csapo et al. | 301/63.107 |
| 7,469,973 B2* | 12/2008 | Coleman et al. | 301/63.107 |
| 8,056,986 B2* | 11/2011 | Jin | 301/64.101 |
| 2007/0175037 A1 | 8/2007 | Coleman et al. | |

* cited by examiner

*Primary Examiner* — S. Joseph Morano
*Assistant Examiner* — Jean Charleston
(74) *Attorney, Agent, or Firm* — McDermott Will & Emery LLP

(57) ABSTRACT

In an automobile wheel, a disc flange of a wheel disc includes bent surface-side edge portions each having an arcuate shape and arranged concentrically with each other, and the bent surface-side edge portions extend from the surface-side end edge of a fitted straight annular portion to be bent radially inward and are dented to a back side of the outer end portions of the lateral edge portions of spokes. The thus configured automobile wheel can exhibit high strength and rigidity against a radial load, a bending load, and a torsional load because of the shape of the bent surface-side edge portions, thereby suppressing deformation of the disc flange caused while an automobile is running. Thus, it is possible to mitigate a stress concentration on a joined portion between the wheel disc and a wheel rim.

5 Claims, 11 Drawing Sheets

AUTOMOBILE WHEEL

CROSS-REFERENCE TO PRIOR APPLICATIONS

This is a U.S. National Phase Application under 35 U.S.C. §371 of International Patent Application No. PCT/JP2009/070876 filed Dec. 15, 2009, which is incorporated by reference herein.

FIELD OF THE INVENTION

The present invention relates to an automobile wheel in which a wheel disc which is to be coupled to an axle is fitted inside a wheel rim on which a tire is to be mounted to join the wheel disc to the wheel rim.

BACKGROUND OF THE INVENTION

Examples of automobile wheels include a so-called two-piece type in which a generally cylindrical wheel rim and a generally disc-like wheel disc are fitted and welded to each other. A known example of the wheel rim forming such a two-piece automobile wheel includes surface-side and back-side bead seats that support beads of a tire, surface-side and back-side flanges, and a well provided between the surface-side and back-side bead seats and dented inward. A known example of the wheel disc includes a circular hub mounting portion that is to be coupled to a hub of an axle, a plurality of spokes provided to extend radially outward from the outer peripheral edge of the hub mounting portion, and an annular disc flange formed continuously with the outer ends of the spokes. The wheel disc is formed with a plurality of ornamental holes defined between adjacent spokes by the spokes and the disc flange. The disc flange of the wheel disc is fitted inside the well of the wheel rim, and the wheel disc and the wheel rim are welded to each other to form an automobile wheel.

An example of the automobile wheel is proposed in Published Japanese Translation of PCT Application No. 2009-525191 (see paragraphs [0016] to [0019] and FIGS. 1 and 2) discussed above, for example, in which a wheel disc includes a flat cylindrical disc flange formed to extend substantially axially and in which ornamental holes are defined by the disc flange and adjacent spokes.

In the automobile wheel according to Published Japanese Translation of PCT Application No. 2009-525191 (see paragraphs [0016] to [0019] and FIGS. 1 and 2) discussed above, the disc flange of the wheel disc is formed in a flat cylindrical shape, and is not curved in the surface-side and back-side direction. Therefore, the ornamental holes which extend to the disc flange are formed to be relatively large, which advantageously provides an excellent design quality. When an automobile to which the automobile wheel is attached is running, the disc flange of the wheel disc receives a radial load via the wheel rim, and a bending load and a torsional load via the spokes from the hub mounting portion. Since the disc flange according to Published Japanese Translation of PCT Application No. 2009-525191 (see paragraphs [0016] to [0019] and FIGS. 1 and 2) has a flat cylindrical shape, the disc flange may be easily deformed when the above load is applied and tends to cause a stress concentration on a welded portion between the wheel rim and the wheel disc. In addition, it is concerned that the stress concentration may reduce the fatigue life.

In order to address the foregoing issues, the present invention proposes an automobile wheel that can exhibit high strength and rigidity.

SUMMARY OF THE INVENTION

The present invention provides an automobile wheel including: a wheel rim including surface-side and back-side bead seats that support beads of a tire, and a well provided between the surface-side and back-side bead seats and dented inward; and a wheel disc including a generally circular hub mounting portion that is to be coupled to a hub of an axle, an annular disc flange fitted inside the well of the wheel rim, a plurality of spokes that couple the hub mounting portion and the disc flange to each other, and ornamental holes defined by adjacent spokes and the disc flange, in which the disc flange of the wheel disc includes a fitted straight annular portion fitted with the well of the wheel rim, and bent surface-side edge portions each having an arcuate shape and arranged concentrically with each other, the bent surface-side edge portions extending from the fitted straight annular portion to be bent radially inward and being dented to a back side of outer end portions of lateral edge portions of the spokes.

The disc flange is formed continuously with the plurality of spokes. Thus, the bent surface-side edge portions are formed at portions of the disc flange that are not formed continuously with the spokes. That is, the plurality of bent surface-side edge portions are provided intermittently along the circumferential direction, each formed to have an arcuate shape, and arranged concentrically with each other. The bent surface-side edge portions are shaped to be bent radially inward. Thus, the arcuate inner end edges of the bent surface-side edge portions form the peripheral edges of the ornamental holes. Therefore, in the configuration according to the present invention, the ornamental holes are not formed to extend to the outermost periphery of the wheel disc. The bent surface-side edge portions are shaped to be dented to the back side of the outer end portions of the lateral edge portions of the spokes. Thus, the inner end edges and the outer end edges of the bent surface-side edge portions are respectively shaped to be dented to the back side of the outer ends of the lateral edge portions of the spokes.

According to such a configuration, in which the disc flange includes the bent surface-side edge portions between adjacent spokes, high strength and rigidity are exhibited by the effect due to the shape of the bent surface-side edge portions. More specifically, high strength and rigidity against a radial load, a bending load, and a torsional load acting on the disc flange can be exhibited by both the effect due to the shape in which the bent surface-side edge portions are bent radially inward from the fitted straight annular portion and the effect due to the shape in which the bent surface-side edge portions are dented to the back side of the outer end portions of the lateral edge portions of the spokes. The strength and the rigidity that can be exhibited by this configuration are higher than those exhibited by only either the effect due to the shape in which the bent surface-side edge portions are bent inward or the effect due to the shape in which the bent surface-side edge portions are dented to the back side. Consequently, it is possible to suppress deformation of the disc flange caused by a load acting on the automobile wheel while an automobile is running. Hence, it is possible to mitigate a stress concentration on a joined portion at which the disc flange of the wheel disc and the well of the wheel rim are joined to each other.

According to the configuration of the present invention, further, the bent surface-side edge portions of the disc flange are dented to the back side, which allows the outer end portions of the spokes to look embossed to the surface side. This allows the spokes to look long in the radial direction, which improves the design quality. In this way, according to this configuration, an excellent design quality can be exhibited while improving the strength and the rigidity.

Furthermore, in the case where a wheel cover is attached to the automobile wheel according to the present invention to cover the aesthetic surface of the automobile wheel, the degree of freedom in designing the wheel cover is enhanced. In the case where a wheel cover provided with openings formed such that the peripheries of the ornamental holes are covered is used, for example, the outer edge portions of the openings which cover the bent surface-side edge portions of the wheel disc can be formed to be significantly inclined to the back side. This is attributable to the fact that the bent surface-side edge portions are shaped to be dented to the back side as described above. In the wheel cover, the outer edge portions of the openings can be designed to be inclined to the back side by a wider range of angles. Accordingly, the wheel cover can be designed to have various configurations, which improves the design quality. In particular, a wheel cover in which the outer edge portions of the openings are significantly inclined to the back side can exhibit a high design quality because the openings can be formed to be large. Thus, the automobile wheel according to the present invention can advantageously exhibit a high design quality even with a wheel cover mounted thereto.

In the automobile wheel discussed above, the bent surface-side edge portions of the disc flange may be formed to be dented in a stepped manner to the back side of the outer end portions of the lateral edge portions of the spokes. In this configuration, in other words, the inner end edges and the outer end edges of the bent surface-side edge portions are respectively formed to be dented in a stepped manner to the back side of the outer ends of the lateral edge portions of the spokes.

According to such a configuration, the bent surface-side edge portions are dented in a stepped manner with respect to the outer end portions of the lateral edge portions of the spokes. Thus, the strength and the rigidity of the disc flange can be further improved by the effect due to the shape in which the bent surface-side edge portions are dented in a stepped manner. Further, it is possible to improve the strength and the rigidity of portions where the disc flange and the outer ends of the spokes are formed continuously with each other. The improvement in strength and rigidity can mitigate a stress concentration due to a radial load, a bending load, or a torsional load discussed above. This improves the effect of suppressing deformation of the disc flange of the wheel disc discussed above, which further improves the effect of mitigating a stress concentration on a joined portion between the wheel rim and the wheel disc. With the bent surface-side edge portions and the outer end portions of the lateral edge portions of the spokes formed in a stepped manner, in addition, the strength and the rigidity of portions where the bent surface-side edge portions and the outer end portions are formed continuously with each other are improved. Accordingly, the dimensions of the portions where the bent surface-side edge portions and the outer end portions are formed continuously with each other (the area occupied by such portions) can be reduced, and thus the ornamental holes can be formed to be large. Therefore, it is possible to advantageously improve the design quality of the automobile wheel and reduce the weight of the automobile wheel.

Further, with the bent surface-side edge portions formed to be dented in a stepped manner with respect to the outer end portions of the lateral edge portions of the spokes, the outer end portions of the spokes are allowed to look embossed further to the surface side. This further improves the effect of enhancing the design quality by allowing the spokes to look long in the radial direction.

In the automobile wheel discussed above, the disc flange may include continuously formed lateral portions having a curved shape and provided on both sides of the bent surface-side edge portions in a circumferential direction, the continuously formed lateral portions continuously connecting the bent surface-side edge portions and the spokes to each other.

According to such a configuration, the bent surface-side edge portions are formed continuously with the spokes via the continuously formed lateral portions having a curved shape. Thus, the functional effect of the present invention discussed above, of mitigating a stress concentration applied on the joined portion between the disc flange and the well via the spokes, is further improved by the effect due to the shape of the continuously formed lateral portions. Further, the effect of allowing the outer end portions of the spokes to look embossed to the surface side is further improved, which further improves the effect of exhibiting an excellent design quality.

In the automobile wheel according to the present invention, as discussed above, the disc flange of the wheel disc includes a fitted straight annular portion and bent surface-side edge portions each having an arcuate shape and arranged concentrically with each other, the bent surface-side edge portions extending from the fitted straight annular portion to be bent radially inward and being dented to the back side of outer end portions of lateral edge portions of the spokes. Thus, high strength and rigidity against a radial load, a bending load, and a torsional load acting on the disc flange can be exhibited by the effect due to the shape of the bent surface-side edge portions. Consequently, it is possible to suppress deformation of the disc flange which may be caused while an automobile is running, and to mitigate a stress concentration on the joined portion between the wheel disc and the wheel rim. Accordingly, the automobile wheel can exhibit a high durability against a load acting while the automobile is running. With the bent surface-side edge portions dented to the back side of the outer end portions of the lateral edge portions of the spokes, in addition, the spokes are allowed to look long in the radial direction (longitudinal direction), which can exhibit an excellent design quality. With the bent surface-side edge portions dented to the back side of the outer end portions of the lateral edge portions of the spokes, furthermore, in the case where a wheel cover is mounted to the automobile wheel, the degree of freedom in designing the wheel cover is improved. Therefore, a wheel cover with an excellent design quality can be advantageously adopted.

In the automobile wheel discussed above, in the case where the bent surface-side edge portions of the disc flange are formed to be dented in a stepped manner to the back side of the outer end portions of the lateral edge portions of the spokes, the strength and the rigidity of the disc flange can be further improved by the effect due to the shape in which the bent surface-side edge portions are dented in a stepped manner. Accordingly, the effect of suppressing deformation of the disc flange is improved. Therefore, the functional effect of the present invention discussed above, of mitigating a stress concentration on the joined portion between the wheel rim and the disc flange, is further improved. With the outer end portions of the spokes allowed to look embossed further to the surface side, in addition, the functional effect of the present invention discussed above, of enhancing the design quality, is further improved.

In the automobile wheel discussed above, in the case where the disc flange includes continuously formed lateral portions having a curved shape and provided on both sides of the bent surface-side edge portions in a circumferential direction, the continuously formed lateral portions continuously connecting the bent surface-side edge portions and the spokes to each other, the functional effect of the present invention discussed above, of mitigating a stress concentration applied on the joined portion between the disc flange and the well via the spokes, is further improved by the effect due to the shape of the continuously formed lateral portions.

DETAILED DESCRIPTION OF THE INVENTION

An example of the present invention will be described in detail with reference to the accompanying drawings.

Figure 1:
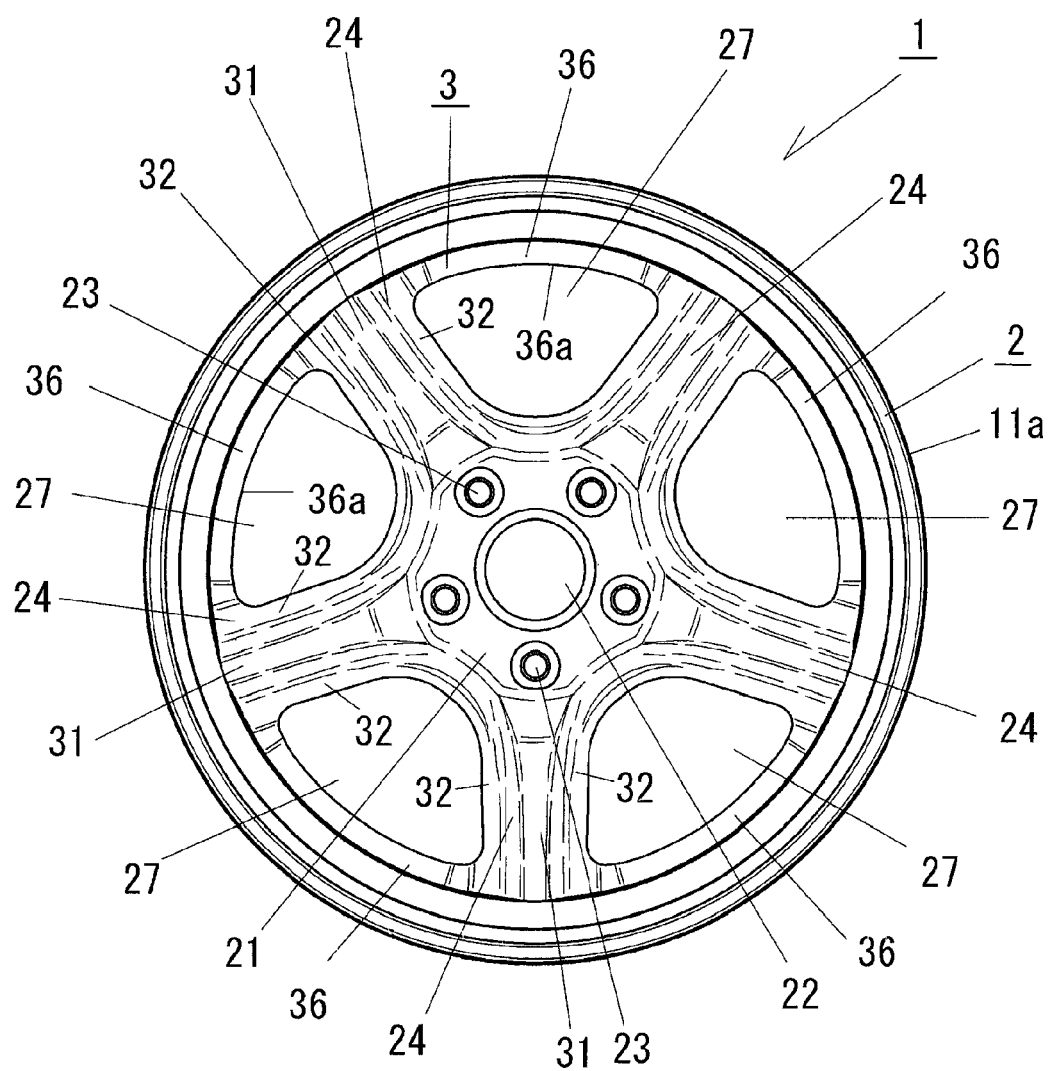
FIG. 1 is a plan view of an automobile wheel according to an example of the present invention.
Figure 2:
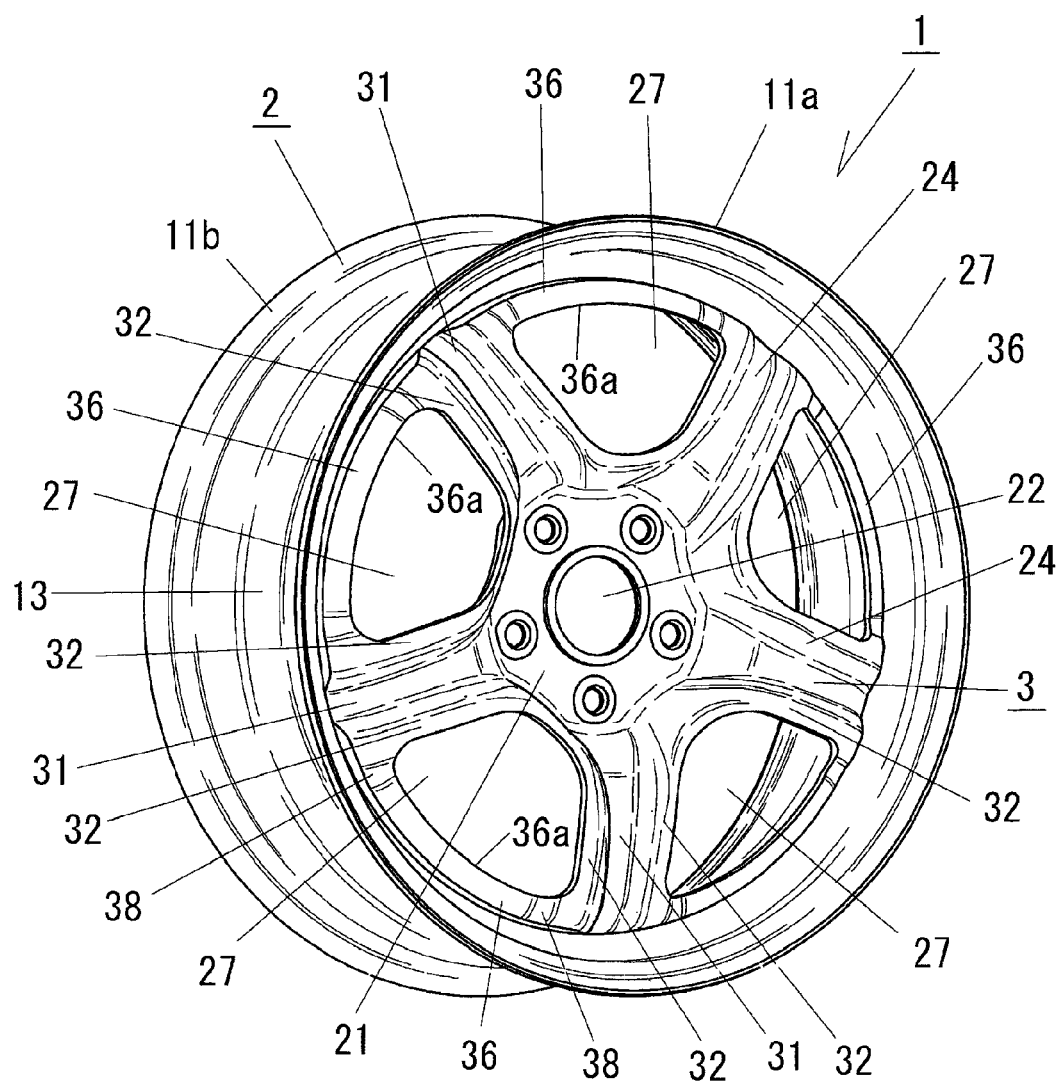
FIG. 2 is a perspective view of the automobile wheel.
Figure 3:
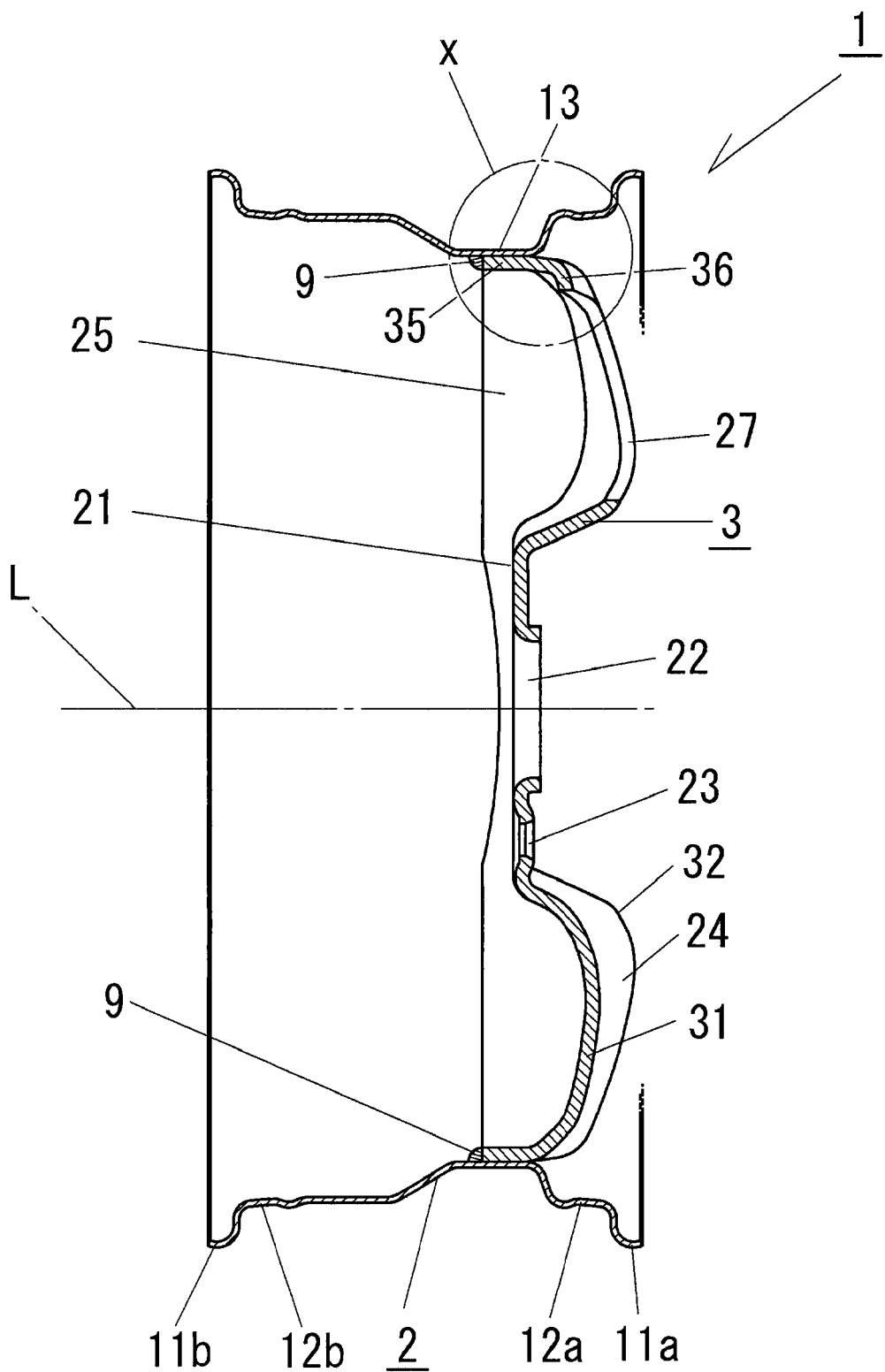
FIG. 3 is a vertical cross-sectional view of the automobile wheel.

As shown in FIGS. 1 to 3, an automobile wheel 1 according to the example has a so-called two-piece configuration in which a disc flange 25 of a wheel disc 3 is fitted inside a well 13 of a wheel rim 2 and in which the well 13 and the disc flange 25 are joined to each other by fillet welding for integration. The wheel rim 2 and the wheel disc 3 are each obtained by shaping a steel flat plate. The automobile wheel 1 according to the example is a steel wheel. A welded portion 9 formed by the fillet welding is the joined portion according to the present invention.

It should be noted that in the example of the present invention, a direction toward an aesthetic surface side of the wheel disk 3 from its back side is designated as a surface side direction, while a direction opposite to the surface side direction is designated as a back side direction. Meanwhile, the direction toward the center axis L (see FIG. 3) of the automobile wheel 1 along the radial direction of the wheel is designated as an inward direction, and the opposite direction is designated as an outward direction.

The wheel rim 2 is shaped into a cylinder of non-circular cross section. The wheel rim 2 has rim flanges 11a, 11b respectively on a surface-side opening edge and a back-side opening edge of the wheel rim 2. The rim flanges 11a, 11b are designed to support respective side walls of a tire (not shown). The rim flange 11a is formed continuously with a surface-side bead seat 12a, while the rim flange 11b is formed continuously with a back-side bead seat 12b. The surface-side bead seat 12a and the back-side bead seat 12b are designed to allow respective beads of the tire to be seated. Further, the well 13 projecting inward is provided between the surface-side bead seat 12a and the back-side bead seat 12b so that the tire can be mounted easily by dropping the beads of the tire into the well 13.

The wheel rim 2 is obtained by shaping a rectangular steel flat plate with predetermined dimensions. More specifically, the rectangular steel flat plate is rolled with its shorter sides butting against each other, and the shorter sides are butt-joined by upset butt welding to be formed into a cylinder body (not shown). The cylinder body is then subjected to rolling. In the rolling, specific inner and outer molds roll to press the cylinder body therebetween from the inside and the outside of the cylinder body, thereby to form the cylinder body into the wheel rim 2 of a desired shape. The wheel rim 2 is formed from the rectangular steel flat plate by a conventionally known method. Therefore, the conventionally known method is not described any further.

Figure 4:
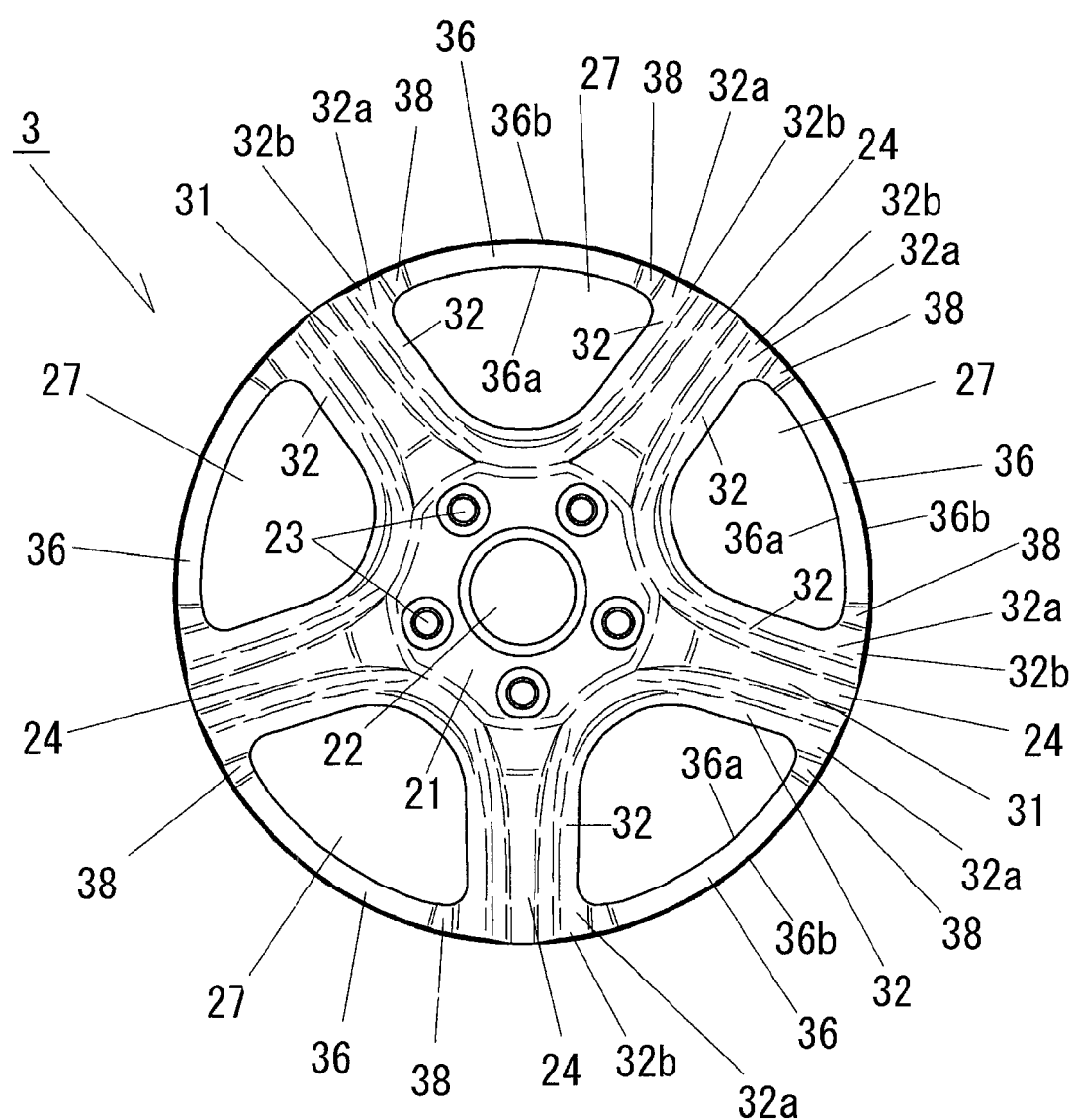
FIG. 4 is a plan view of a wheel disc.
Figure 5:
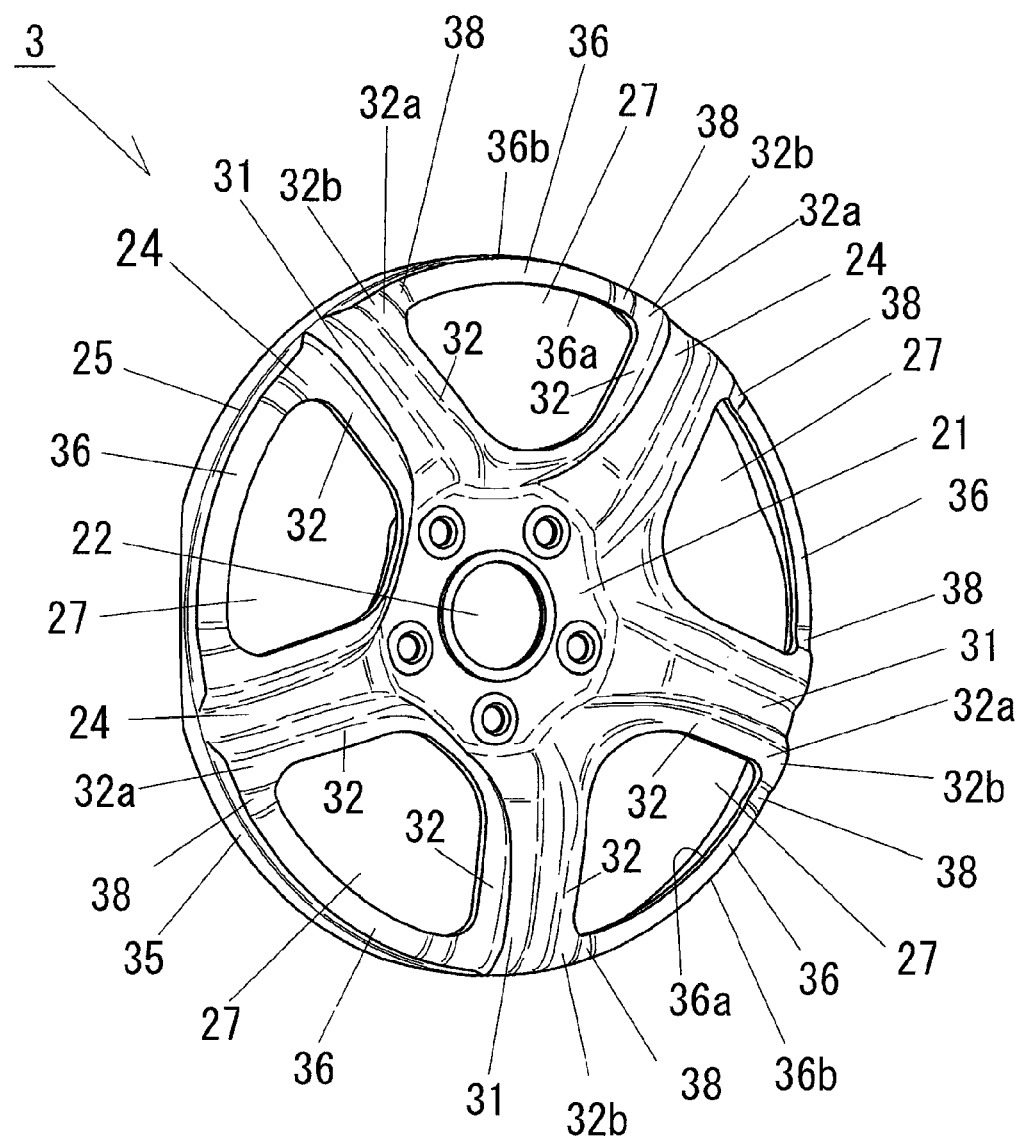
FIG. 5 is a perspective view of the wheel disc.

Meanwhile, as shown in FIGS. 4 and 5, the wheel disc 3 described above is generally in the shape of a disc. The wheel disc 3 includes a generally circular hub mounting portion 21 having a hub hole 22 opening in its center, and a plurality of spokes 24 extending radially outward from the outer peripheral edge of the hub mounting portion 21. The annular disc flange 25, which is coupled to the outer ends of the spokes 24, is provided to extend to the back side from the outer ends of the spokes 24. That is, the hub mounting portion 21 and the disc flange 25 are coupled to each other by the plurality of spokes 24. The spokes 24 are provided at equal intervals in the circumferential direction. Ornamental holes 27 are defined by adjacent spokes 24, 24 and the disc flange 25. In the embodiment, five spokes 24 and five ornamental holes 27 are provided.

In the hub mounting portion 21, a plurality of bolt holes 23 each having a nut seat are formed by drilling around the hub hole 22 at equal intervals on the same circumference. The hub mounting portion 21 and the disc flange 25 are arranged concentrically with each other around the center axis L of the wheel disc 3.

The wheel disc 3 is obtained by cutting each of the four corners of a generally square steel flat plate into an arcuate shape, and then by performing a pressing process. More specifically, the steel flat plate with each of the four corners cut into an arcuate shape is formed into a saucer shape in which a circular dent is formed at the center, then the hub mounting portion 21 and the spokes 24 are shaped by a drawing process, and the bolt holes 23 and the ornamental holes 27 are formed by a drilling process. Additionally, the saucer-shaped plate is subjected to restriking to form the disk flange 25, thus to complete the forming of the wheel disk 3. These steps of forming the wheel disk 3 are performed in a conventional manner, and therefore the steps are not described any further.

Part of the present invention is now described.

In the example, the spokes 24 of the wheel disc 3 described above each include a center groove 31 formed along the longitudinal direction (radial direction) of the spoke 24 and lateral edge portions 32, 32 provided on both sides of the center groove 31 (see FIGS. 1 to 7). The lateral edge portions 32, 32 are provided to project to the surface side with respect to the center groove 31. The configured shaped spokes 24 can provide improved strength and rigidity. In the example, further, outer end portions 32a, 32a of the lateral edge portions 32, 32 of the spokes 24 are shaped to be widened on both sides in the circumferential direction (see FIG. 7). By forming the outer end portions 32a, 32a of the lateral edge portions 32, 32 in this way, the strength and the rigidity of portions where the spokes 24 and the disc flange 25 are formed continuously with each other can be improved.

As shown in FIGS. 3 to 7, the disc flange 25 described above includes a fitted straight annular portion 35 extending along the surface-side and back-side direction and bent surface-side edge portions 36 extending from the surface-side end edge of the fitted straight annular portion 35 to be bent radially inward. The bent surface-side edge portions 36 are respectively formed at portions of the disc flange 25 that are not formed continuously with the spokes 24, and provided between adjacent spokes 24. Each of the bent surface-side edge portions 36 is formed continuously with the lateral edge portions 32, 32 of the spokes 24, 24 via continuously formed lateral portions 38, 38 provided on both sides of the bent surface-side edge portion 36 in the circumferential direction. The continuously formed lateral portions 38 are formed in a curved shape, and smoothly continuously connect the bent surface-side edge portions 36 and the lateral edge portions 32 of the spokes 24 to each other. In addition, the fitted straight annular portion 35 is fitted inside the well 13 of the wheel rim 2 to be welded to the well 13.

The bent surface-side edge portions 36 of the disc flange 25 are provided intermittently in the circumferential direction at surface-side portions of the fitted straight annular portion 35 that are not formed continuously with the spokes 24. The bent surface-side edge portions 36 are each formed in an arcuate shape to extend along the fitted straight annular portion 35 described above, and arranged concentrically with each other around the center axis L. The bent surface-side edge portions 36 are formed to be dented in a stepped manner to the back side of the outer end portions 32a of the lateral edge portions 32 of the spokes 24. That is, an arcuate inner end edge 36a of each bent surface-side edge portion 36 is formed to be dented in a stepped manner to the back side of outer ends 32b of the lateral edge portions 32 of the spokes 24, and an arcuate outer end edge 36b of each bent surface-side edge portion 36 is formed to be dented in a stepped manner to the back side of the outer ends 32b of the lateral edge portions 32 of the spokes 24. The continuously formed lateral portions 38, which continuously connect the bent surface-side edge portions 36 and the outer end portions 32a of the lateral edge portions 32 of the spokes 24 to each other, form stepped portions at which the bent surface-side edge portions 36 and the outer end portions 32a are stepped with respect to each other.

Figure 6:
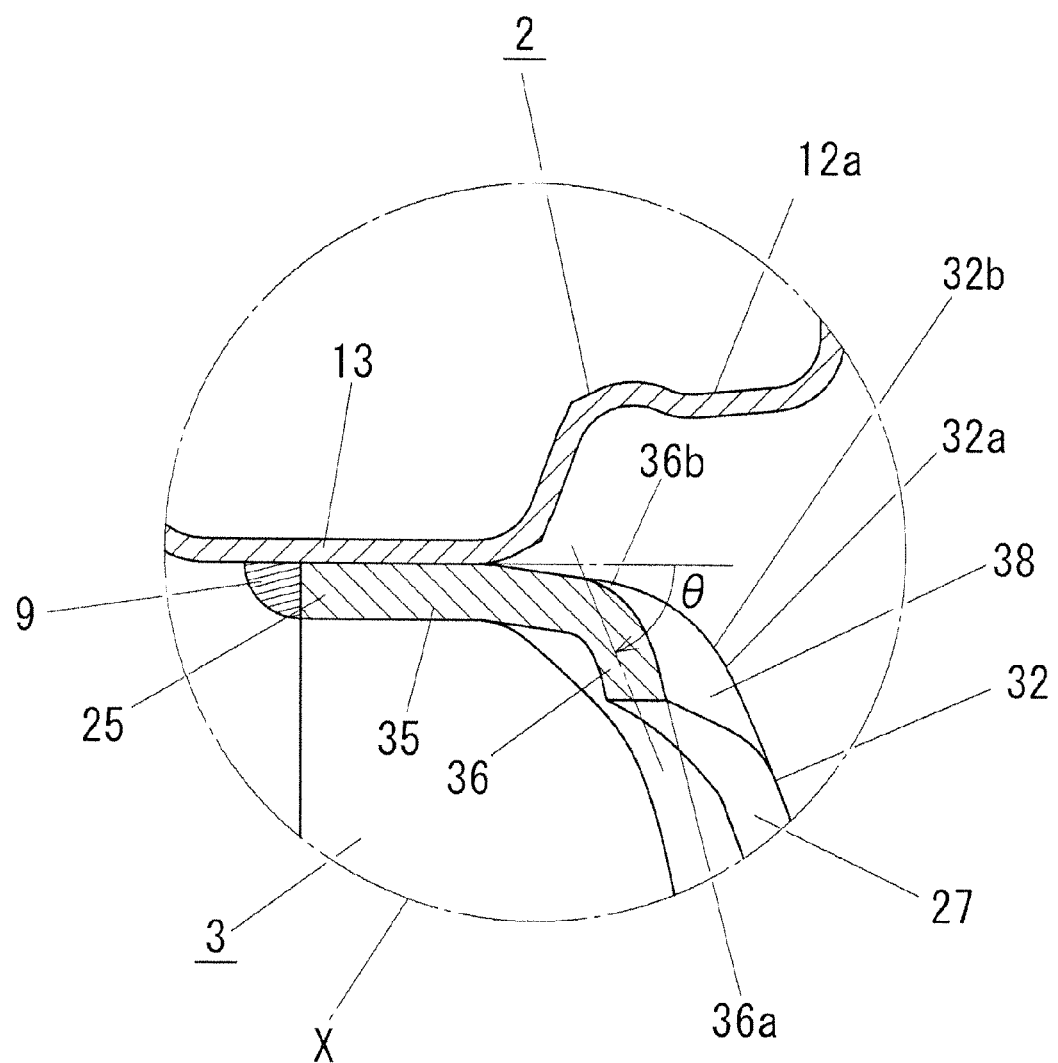
FIG. 6 is an enlarged view of the part X of FIG. 3.
Figure 7:
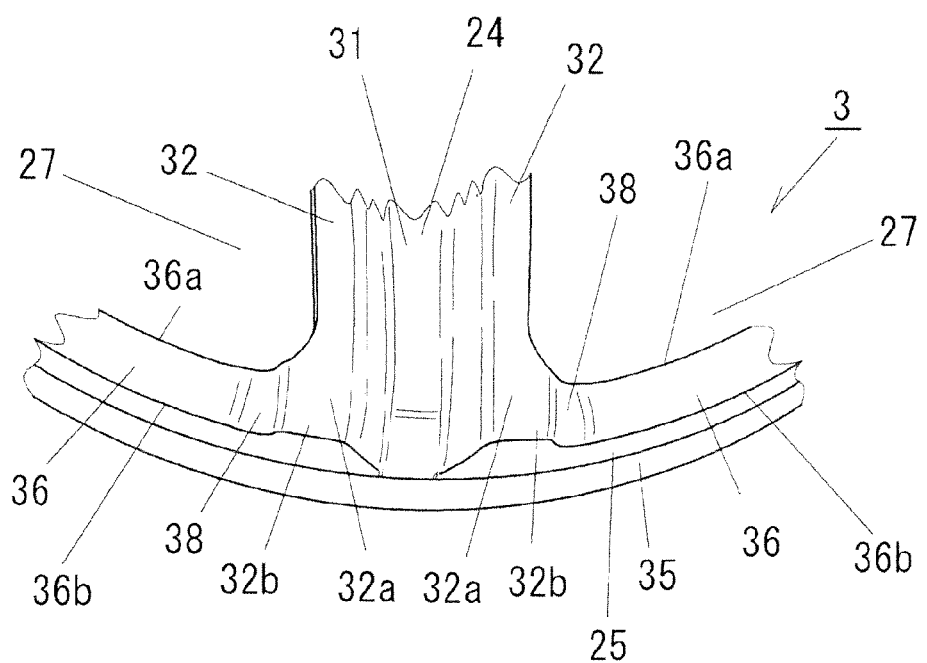
FIG. 7 is a partially enlarged view showing an area of the wheel disc where a spoke and a bent surface-side edge portion are formed continuously with each other.

In each bent surface-side edge portion 36, as shown in FIG. 6, the bent angle θ between the bent surface-side edge portion 36 and the fitted straight annular portion 35 is set to be 90 degrees or less. That is, the bent surface-side edge portion 36 is not bent to the back side from the surface-side end edge of the fitted straight annular portion 35. In the bent surface-side edge portion 36, the bent angle θ is preferably equal to or more than 45 degrees and equal to or less than 90 degrees. This tends to enhance the effect of improving the strength and the rigidity to be discussed later. The bent surface-side edge portion 36 is preferably bent to be curved radially inward from the fitted straight annular portion 35.

Each of the bent surface-side edge portions 36 described above is formed in a generally uniform shape along the circumferential direction, and the arcuate inner end edge 36a of the bent surface-side edge portion 36 faces the ornamental hole 27. The ornamental hole 27 described above is formed as a hollow area surrounded by the lateral edge portions 32, 32 of adjacent spokes 24, 24 and the bent surface-side edge portion 36 between the lateral edge portions 32, 32. That is, the peripheral edge of the ornamental hole 27 is formed by the lateral edge portions 32, 32 of the spokes 24, 24 and the bent surface-side edge portion 36 between the lateral edge portions 32, 32.

According to the configuration of the embodiment, as discussed above, the disc flange 25 of the wheel disc 3 includes the bent surface-side edge portions 36 between adjacent spokes 24, 24. Thus, the strength and the rigidity of the disc flange 25 can be improved by the effect due to the shape of the bent surface-side edge portions 36. Accordingly, the strength and the rigidity of the wheel disc 3 can be improved, which can improve the strength and the rigidity of the automobile wheel 1 as a whole.

The disc flange 25 of the wheel disc 3 can exhibit a high resistance against a radial load applied via the wheel rim 2 and a bending/torsional load applied via the hub mounting portion 21, which is attached to an axle, and the spokes 24 when an automobile to which the automobile wheel 1 is attached is running. This improves the effect of suppressing deformation of the disc flange 25, which can mitigate a stress concentration on the welded portion 9 between the disc flange 25 and the well 13 of the wheel rim 2. Further, it is possible to mitigate a stress concentration applied on the portions where the spokes 24 and the disc flange 25 are formed continuously with each other in response to the bending/torsional load applied via the spokes 24 described above. In the embodiment, in particular, the bent surface-side edge portions 36 are formed to be dented in a stepped manner to the back side of the outer end portions 32a, 32a of the lateral edge portions 32, 32 of the spokes 24. Thus, the continuously formed lateral portions 38, 38, which continuously connect the bent surface-side edge portions 36 and the lateral edge portions 32, 32 of the spokes 24 to each other, form a so-called rib structure. This further improves the effect of mitigating a stress concentration on the welded portion 9 and a stress concentration on the portions where the spokes 24 and the disc flange 25 are formed continuously with each other described above.

The functional effect of improving the strength and the rigidity of the disc flange 25 of the wheel disc 3 can be exhibited by both the effect due to the shape in which the bent surface-side edge portions 36 are bent radially inward and the effect due to the shape in which the bent surface-side edge portions 36 are dented to the back side in a stepped manner. Therefore, the configuration according to the embodiment can exhibit high strength and rigidity compared to a configuration in which only one of the effects due to the shapes described above is provided, and thus is excellent in achieving the functional effect described above.

Figure 8:
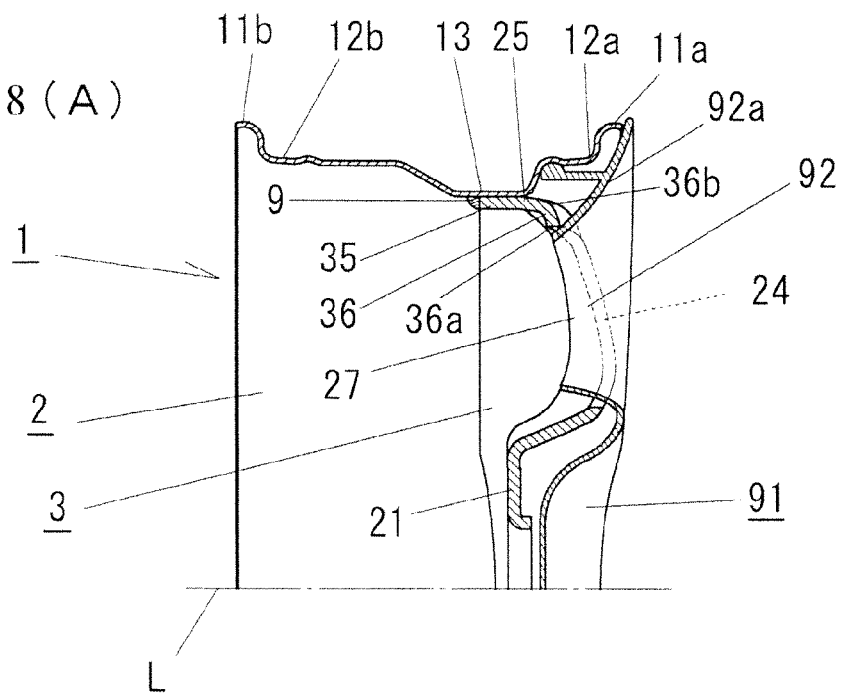
FIG. 8(A) is a partially enlarged vertical cross-sectional view showing a state in which a wheel cover is mounted to the automobile wheel according to the example.
FIG. 8(B) is a partially enlarged vertical cross-sectional view showing a state in which a wheel cover is mounted to an automobile wheel according to a comparative example.
Figure 8:
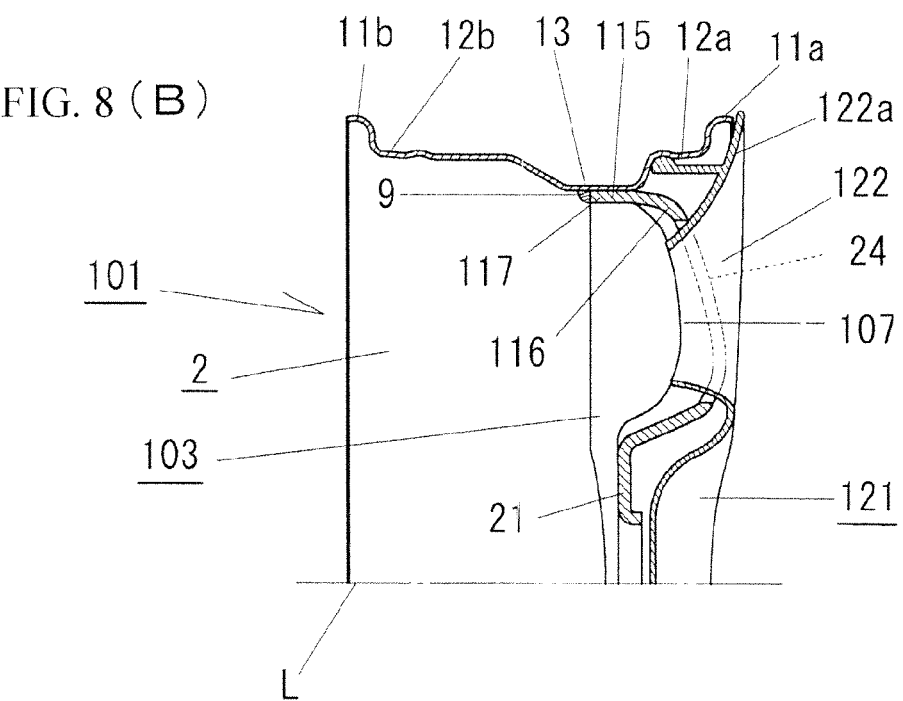
Figure 11:
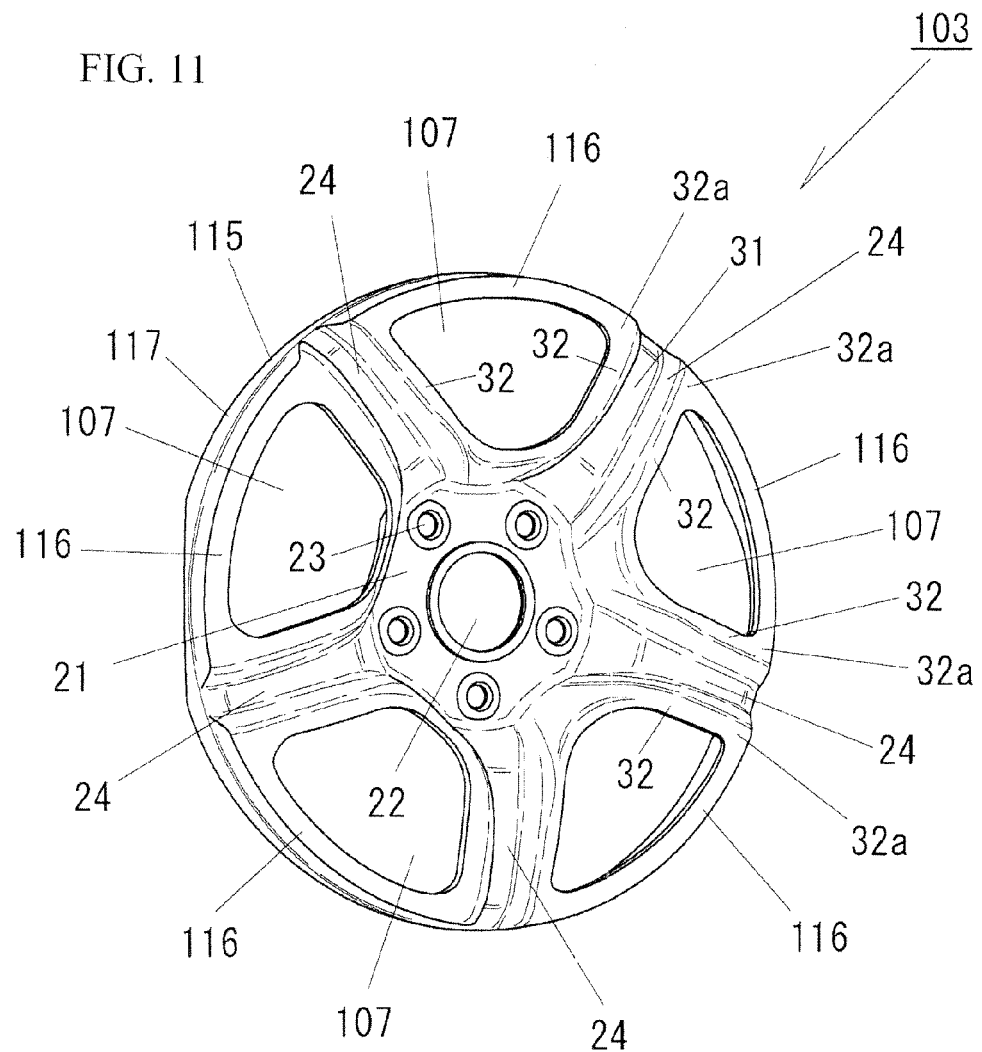
FIG. 11 is a perspective view of a wheel disc according to the comparative example.

An automobile wheel 101 (see FIG. 8(B)) in which a disc flange 115 of a wheel disc 103 includes bent edge portions 116 bent radially inward, for example, is illustrated in FIG. 11 as a comparative example. The disc flange 115 includes a fitted straight annular portion 117 and the bent edge portions 116 extending from the surface-side end edge of the fitted straight annular portion 117 to be bent radially inward. The bent edge portions 116 are formed continuously with the outer end portions 32a, 32a of the lateral edge portions 32, 32 of the spokes 24, 24 to be generally in flush with the outer end portions 32a, 32a in the circumferential direction and not to be dented to the back side. Ornamental holes 107 are defined by the lateral edge portions 32, 32 of adjacent spokes 24, 24 and the bent edge portions 116 of the disc flange 115. According to the configuration of the comparative example, the effect due to the shape in which the bent edge portions 116 are bent inward is exhibited to improve the strength and the rigidity of the disc flange 115. In the configuration according to the comparative example, however, bent surface-side edge portions 36 shaped to be dented to the back side in a stepped manner are not provided, unlike the configuration according to the example discussed above. Thus, the bent edge portions 116 according to the comparative example cannot exhibit the same effect due to the shape of the bent surface-side edge portions 36. Therefore, the configuration according to the example can exhibit high strength and rigidity compared to the configuration according to the comparative example described above, and can achieve the functional effect discussed above. Further, in the configuration according to the example, as discussed above, the continuously formed lateral portions 38, 38 of the bent surface-side edge portions 36 form a rib structure, which accordingly provides improved strength and rigidity. Thus, the dimensions (area) of the continuously formed lateral portions 38, 38 can be reduced compared to the configuration according to the comparative example described above. The ornamental holes 27 can be formed to be accordingly large, which can advantageously improve the design quality and reduce the weight.

In the configuration according to the example, in addition, the bent surface-side edge portions 36 are formed to be dented in a stepped manner to the back side of the outer end portions 32a of the lateral edge portions 32 of the spokes 24. Thus, the outer end portions (32a, 32a) of the lateral edge portions 32, 32 of the spokes 24 are allowed to look embossed to the surface side. This can produce the effect of allowing the spokes 24 to look long along the longitudinal direction (radial direction), and thus can enhance the design quality of the surface side of the automobile wheel 1.

In the configuration according to the example, furthermore, the bent surface-side edge portions 36 forming the outer edges of the ornamental holes 27 are dented to the back side. Thus, in the case where a wheel cover 91 is mounted to the automobile wheel 1 as shown in FIG. 8(A), for example, the degree of freedom in designing the shape of the wheel cover 91 is improved. The wheel cover 91 is configured to include openings 92 formed such that the peripheral edges of the ornamental holes 27 of the automobile wheel 1 are covered. In the configuration shown in FIG. 8(A), outer edge portions 92a of the openings 92 are formed to be close to the inner end edges 36a of the bent surface-side edge portions 36 of the wheel disc 3 defining the ornamental holes 27. This increases the opening areas of the openings 92 as much as possible. In contrast, FIG. 8(B) shows a state in which a wheel cover 121 similarly provided with openings 122 is mounted to the automobile wheel 101 (see FIG. 11) configured in accordance with the comparative example discussed above. Comparing the openings 122 of the wheel cover 121 shown in FIG. 8(B) and the openings 92 of the wheel cover 91 in the example shown in FIG. 8(A), the outer edge portions 92a of the openings 92 according to the embodiment are inclined to the back side at a large angle compared to outer edge portions 122a of the openings 122 according to the comparative example. Consequently, the openings 92 according to the example are large in opening area compared to the openings 122 according to the comparative example. Therefore, the wheel cover 91 according to the example can exhibit a high design quality compared to the configuration according to the comparative example. That is, the automobile wheel 1 according to the example shown in FIGS. 2 and 8(A), even with the wheel cover 91 mounted thereto, can advantageously exhibit a high design quality compared to the configuration according to the comparative example shown in FIGS. 8(B) and 11. This functional effect is achieved by providing the wheel disc 3 with the bent surface-side edge portions 36 dented to the back side in the example. It is also possible to mount the wheel cover 121, which is the same as the wheel cover for the automobile wheel 101 according to the comparative example, to the automobile wheel 1 according to the example. This means that the degree of freedom in designing the shape of the wheel cover is improved compared to the configuration according to the comparative example.

Figure 9:
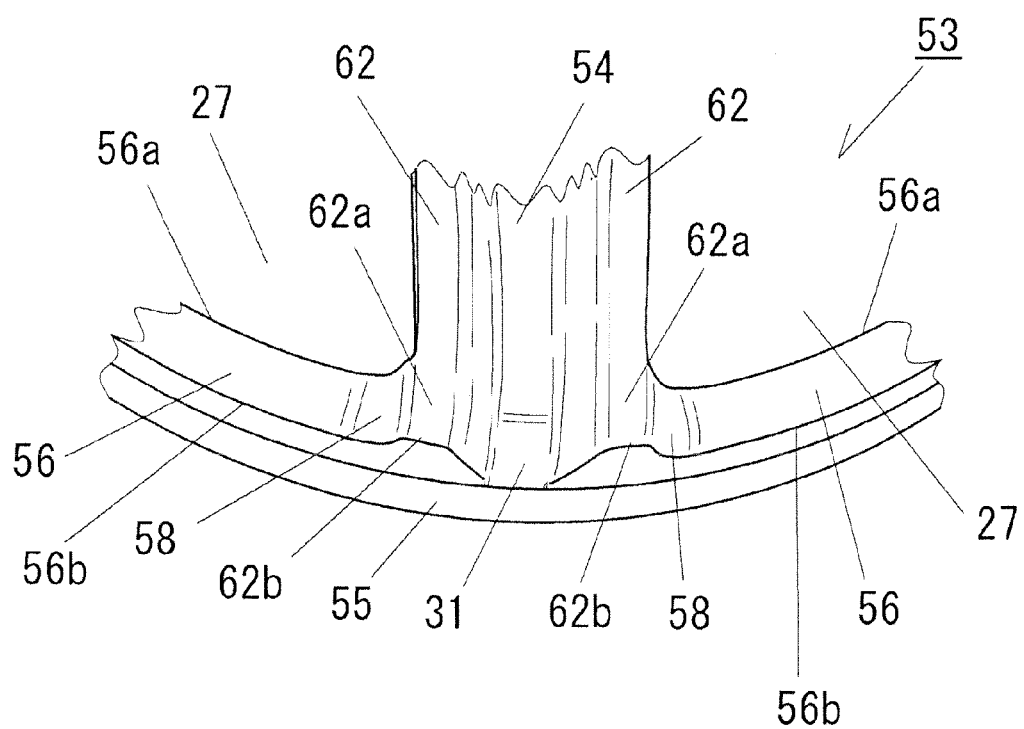
FIG. 9 is a partially enlarged view showing an area of a wheel disc according to an alternative example where a spoke and a bent surface-side edge portion are formed continuously with each other.

As in a wheel disc 53 shown in FIG. 9, which is an alternative example to that discussed above, outer end portions 62a, 62a of lateral edge portions 62, 62 of spokes 54 may be formed to extend outward generally linearly and generally in parallel with each other. The outer end portions 62a, 62a of the lateral edge portions 62, 62 and bent surface-side edge portions 56 formed on a disc flange 55 are formed continuously with each other via continuously formed lateral portions 58, 58 having a curved shape. Also in the configuration shown in FIG. 9, as in the embodiment shown in FIGS. 1 to 7 discussed above, the bent surface-side edge portions 56 are formed to be dented in a stepped manner to the back side of the outer end portions 62a of the lateral edge portions 62 of the spokes 54. Inner end edges 56a and outer end edges 56b of the bent surface-side edge portions 56 are respectively formed to be dented in a stepped manner to the back side of outer ends 62b of the lateral edge portions 62 of the spokes 54. The configuration of the alternative example (the configuration of FIG. 9) is the same as the configuration according to the example described above (the configuration of FIG. 7) except that the outer end portions 62a, 62a of the lateral edge portions 62, 62 of the spokes 54 are not widened. Thus, like constituent components are denoted by like reference numerals, and the description is not repeated here. According to the configuration of the alternative example (the configuration of FIG. 9), the strength and the rigidity exhibited by the outer end portions 62a, 62a of the lateral edge portions 62, 62 of the spokes 54 are reduced compared to the configuration according to the example described above (the configuration of FIG. 7), but are enhanced due to the shape of the bent surface-side edge portions 56 compared to the configuration according to the comparative example described above (the configuration of FIG. 11). Therefore, the configuration according to the alternative example (the configuration of FIG. 9) can also achieve the same functional effect as that achieved by the configuration according to the example discussed above (the configuration of FIG. 7).

Figure 10:
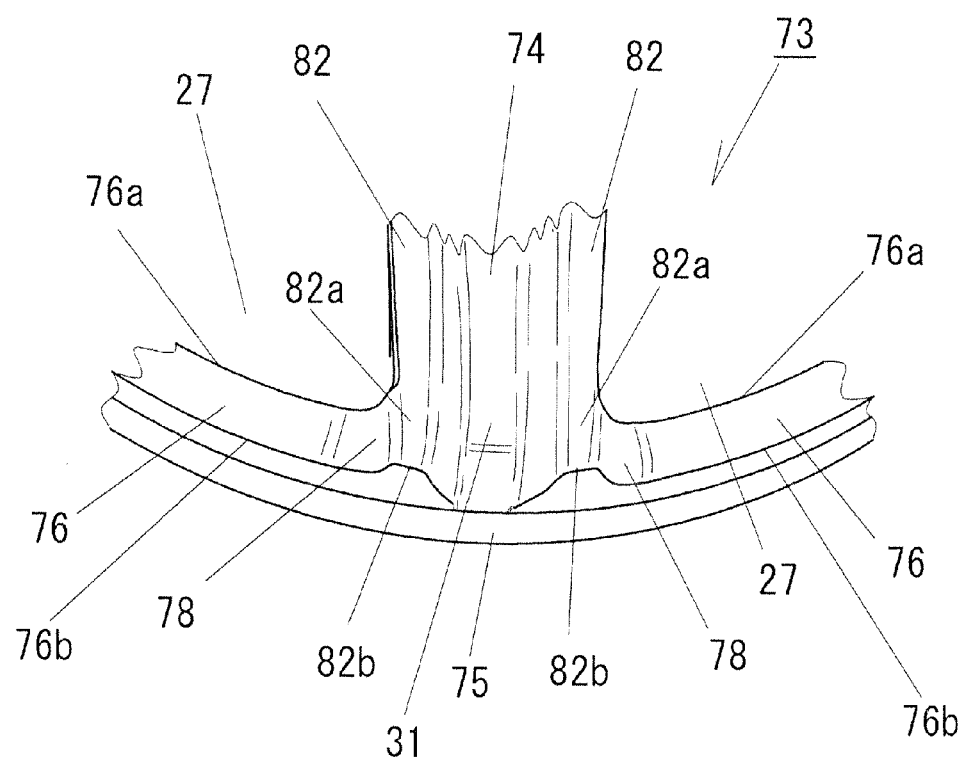
FIG. 10 is a partially enlarged view showing an area of a wheel disc according to another alternative example where a spoke and a bent surface-side edge portion are formed continuously with each other.

As in a wheel disc 73 shown in FIG. 10, which is another alternative example, outer end portions 82a, 82a of lateral edge portions 82, 82 of spokes 74 may be formed to extend outward generally linearly in a tapered shape. The outer end portions 82a, 82a of the lateral edge portions 82, 82 and bent surface-side edge portions 76 formed on a disc flange 75 are formed continuously with each other via continuously formed lateral portions 78, 78 having a curved shape. Also in the configuration shown in FIG. 10, as in the embodiment discussed above, the bent surface-side edge portions 76 are formed to be dented in a stepped manner to the back side of the outer end portions 82a of the lateral edge portions 82 of the spokes 74. Inner end edges 76a and outer end edges 76b of the bent surface-side edge portions 76 are respectively formed to be dented in a stepped manner to the back side of outer ends 82b of the lateral edge portions 82 of the spokes 74. Also according to the configuration of the alternative example (the configuration of FIG. 10), as in the configuration in which the outer end portions 62a, 62a extend generally in parallel with each other described above (the configuration of FIG. 9), high strength and rigidity can be exhibited by the effect due to the shape of the bent surface-side edge portions 76 compared to the configuration according to the comparative example described above (the configuration of FIG. 11).

Therefore, the configuration according to the alternative example (the configuration of FIG. 10) can also achieve the same functional effect as that achieved by the configuration according to the example discussed above (the configuration of FIG. 7).

In the example discussed above, the continuously formed lateral portions 38, 38 of the bent surface-side edge portions 36 are formed to have a curved shape. In other configurations, however, the continuously formed lateral portions may be shaped to be inclined to extend generally linearly, or shaped to extend generally linearly along the surface-side and back-side direction. In either configuration, the bent surface-side edge portions are formed in a stepped manner through the continuously formed lateral portions, and thus it is possible to achieve the same functional effect as that achieved by the configuration according to the example discussed above.

The automobile wheel according to the example discussed above has five spokes. However, the present invention is not limited thereto, and may be applied to automobile wheels include any plural number of spokes such as three, four, six, or seven spokes.

The automobile wheel according to the example discussed above is formed by joining a wheel rim and a wheel disc each shaped by processing a steel flat plate. However, the wheel rim and the wheel disc may each be shaped by processing an aluminum alloy flat plate. Further, the wheel rim and the wheel disc may each be shaped by processing a magnesium alloy or titanium alloy flat plate. The wheel rim and the wheel disc may be shaped by processing plates made of different kinds of metal.

The present invention is not limited to the example discussed above, and may be modified appropriately within the scope and spirit of the present invention. For example, the spokes may have the different shapes from the example discussed above.

What is claimed is:

1. An automobile wheel comprising:
   a wheel rim including:
      surface-side and back-side bead seats that support beads of a tire, and
      a well provided between the surface-side and back-side bead seats and dented toward a center axis of the automobile wheel; and
   a wheel disc including:
      a generally circular hub mounting portion that is to be coupled to a hub of an axle,
      an annular disc flange fitted inside the well of the wheel rim,
      a plurality of spokes that couple the hub mounting portion and the disc flange to each other, and
      ornamental holes defined by adjacent spokes and the disc flange,
   wherein the disc flange of the wheel disc includes, between adjacent two of the plurality of spokes:
      a fitted straight annular portion fitted with the well of the wheel rim, and
      bent surface-side edge portions each having an arcuate shape and arranged concentrically with each other, the bent surface-side edge portions extending from the fitted straight annular portion to be bent radially inward,
   wherein the bent surface-side edge portions and the adjacent two of the plurality of spokes are connected such that the bent surface-side edge portions locate inside of the automobile wheel with respect to an outer end portions of lateral edge portions of the spokes, and
   wherein the bent surface side edge portions of the disc flange are formed dented in a stepped manner toward a back side of the wheel rim with respect to the outer end portions of the lateral edge portions of the spokes.

2. The automobile wheel according to claim 1,
   wherein the disc flange includes continuously formed lateral portions having a curved shape and provided on both sides of the bent surface-side edge portions in a circumferential direction, the continuously formed lateral portions continuously connecting the bent surface-side edge portions and the spokes to each other.

3. An automobile wheel comprising:
   a wheel rim including:
      surface-side and back-side bead seats that support beads of a tire, and
      a well provided between the surface-side and back-side bead seats and dented toward a center axis of the automobile wheel; and
   a wheel disc including:
      a generally circular hub mounting portion that is to be coupled to a hub of an axle,
      an annular disc flange fitted inside the well of the wheel rim,
      a plurality of spokes that couple the hub mounting portion and the disc flange to each other, and
      ornamental holes defined by adjacent spokes and the disc flange,
   wherein the disc flange of the wheel disc includes, between adjacent two of the plurality of spokes:
      a fitted straight annular portion fitted with the well of the wheel rim, and
      bent surface-side edge portions each having an arcuate shape and arranged concentrically with each other, the bent surface-side edge portions extending from the fitted straight annular portion to be bent radially inward,
   wherein the bent surface-side edge portions and the adjacent two of the plurality of spokes are connected such that the bent surface-side edge portions locate inside of the automobile wheel with respect to an outer end portions of lateral edge portions of the spokes,
   wherein a bent angle θ between the bent surface-side edge portion and the fitted straight annular portion is 90 degrees or less, and
   wherein steps are formed between the bent surface-side edge portions and the adjacent two of the plurality of spokes.

4. The automobile wheel according to claim 1,
   wherein a bent angle θ between the bent surface-side edge portion and the fitted straight annular portion is 90 degrees or less.

5. The automobile wheel according to claim 3,
   wherein the bent angle θ is equal to or more than 45 degrees and equal to or less than 90 degrees.

* * * * *